US008838805B2

(12) United States Patent
Brodin et al.

(10) Patent No.: US 8,838,805 B2
(45) Date of Patent: Sep. 16, 2014

(54) METHOD AND APPARATUS FOR ESTABLISHING A STREAMED MEDIA SESSION

(75) Inventors: Per-Erik Brodin, Sollentuna (SE); Jiong Sun, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 960 days.

(21) Appl. No.: 12/812,126

(22) PCT Filed: May 13, 2008

(86) PCT No.: PCT/SE2008/050556
§ 371 (c)(1),
(2), (4) Date: Jul. 8, 2010

(87) PCT Pub. No.: WO2009/088333
PCT Pub. Date: Jul. 16, 2009

(65) Prior Publication Data
US 2010/0293445 A1  Nov. 18, 2010

Related U.S. Application Data

(60) Provisional application No. 61/020,489, filed on Jan. 11, 2008.

(51) Int. Cl.
G06F 15/173 (2006.01)
H04L 29/08 (2006.01)
H04L 29/06 (2006.01)

(52) U.S. Cl.
CPC ............ *H04L 65/80* (2013.01); *H04L 67/147* (2013.01); *H04L 67/14* (2013.01)
USPC ........................................................ 709/227

(58) Field of Classification Search
CPC ........ H04L 67/147; H04L 65/80; H04L 67/14
USPC ............... 709/217, 227; 370/255, 260; 707/1; 714/748, 807
See application file for complete search history.

(56) References Cited

U.S. PATENT DOCUMENTS 7,263,071 B2 * 8/2007 Yim .............................. 370/260
2004/0148400 A1 7/2004 Mostafa
(Continued)

FOREIGN PATENT DOCUMENTS

EP  1758334 A1  2/2007
WO  01/33418 A2  5/2001
(Continued)

OTHER PUBLICATIONS

Rosenberg, et al. "SIP: Session Initiation Protocol RFC 3261," pp. 77-86. Jun. 2002. The Internet Society, Reston, VA.
(Continued)

*Primary Examiner* — Jungwon Chang
(74) *Attorney, Agent, or Firm* — Coats & Bennett, PLLC

(57) ABSTRACT

A method and an arrangement for enabling a communication session for streamed media between a client terminal and a server. A request-to-establish message is sent (202) from the client terminal, supplemented with a checksum generated (200) for available SDP information. The checksum is compared to a checksum generated for correct SDP information available at the server. A response message indicating the result of the comparison is received from the server (204). If the comparison indicates that the SDP information available at the server is incorrect, the response message is supplemented with the correct SDP information, to update (210) the available SDP information. The client terminal is then sending a new request-to-message supplemented with the updated SDP information. On the other hand, if the available SDP information is correct, streamed media is started to be sent (208) from the server to the client terminal. Generating a checksum of SDP information available at the client terminal and supplement to a request-to-establishment message, enables for the server to check that the SDP information available at the client terminal is up to date, thereby achieving a fast and reliable establishment of a communication session for streamed media between a client terminal and a server.

25 Claims, 7 Drawing Sheets

(56) References Cited

U.S. PATENT DOCUMENTS

| | | | |
|---|---|---|---|
| 2005/0091190 A1* | 4/2005 | Klemets | 707/1 |
| 2006/0253544 A1* | 11/2006 | Luoma et al. | 709/217 |
| 2008/0123560 A1* | 5/2008 | Nassor et al. | 370/255 |
| 2009/0172170 A1* | 7/2009 | Rey | 709/227 |

FOREIGN PATENT DOCUMENTS

| | | | |
|---|---|---|---|
| WO | 02/51178 A1 | 6/2002 | |
| WO | 02/080590 A2 | 10/2002 | |
| WO | 2007022875 A1 | 3/2007 | |

OTHER PUBLICATIONS

Schulzrinne, et al., "Real Time Streaming Protocol (RTSP) RFC 2326." Apr. 1998. The Internet Society, Reston, VA.

Handley, et al., "SDP: Session Description Protocol RFC 2327." Apr. 1998. The Internet Society, Reston, VA.

3GPP, "Universal Mobile Telecommunications System (UMTS); Transparent end-to-end Packet-switched Streaming Service (PSS); Protocols and codecs." 3GPP TS 26.234 v.7.4.0 Release 7. Oct. 2007. ETSI 3GPP, Sophia Antipolis, France.

Rivest, R., "The MD5 Message-Digest Algorithm RFC 1321." Apr. 1992. The Internet Society, Reston, VA.

* cited by examiner

METHOD AND APPARATUS FOR ESTABLISHING A STREAMED MEDIA SESSION

TECHNICAL FIELD

The present invention relates generally to establishment of Packet-switched Streaming Service (PSS) sessions, where streamed media is sent from a server to a client terminal. In particular, the present invention can be used where a mobile phone receives streamed media data from a media data server.

BACKGROUND

In packet-switched communication service systems, digital information is divided into a plurality of information packets which are distributed through a communication network from a sending party to a receiving party. Typically, the information packets are distributed using a plurality of communication paths between the sending party and the receiving party, and the original information is reconstructed at the receiving party from the received information packets. Although the information packets may be distributed using different communication paths, the sending party and the receiving party can be said to be connected by a virtual communication link. By setting up such a virtual communication link, a communication session for sending streamed media data will be established.

In this description, a client terminal is receiving streamed media over a virtual communication link. However, the client terminal and the server, respectively, may be any type of communication equipment suitable for transmitting or receiving streamed media on any type of communication link. For instance, the client terminal can be a mobile terminal in a UMTS (Universal Mobile Telecommunications System) or a computer connected to a computer communication network, etc.

With reference to FIG. 1, a procedure where a client terminal 100 is setting up a communication session for streamed media data with a server 102, according to prior art will now be schematically described. In a first step 1:1, the client terminal 100 initiates a communication session for streamed media data by sending a request to the server 102. Typically, the request is a <SETUP> message, according to known standards, and is therefore not necessary to describe in more detail here. In a following step 1:2, the server 102 confirms and accepts the request by sending an <OK> message to the client terminal 100. Then in a further step 1:3, the client terminal 100 sends another request to the server 102, to initiate the sending of media data from the server 102 to the client terminal. Typically, the start command is a <PLAY> message. In a subsequent step 1:4, the server 102 confirms and accepts the request to send media data, by sending another <OK> message to the client terminal 100. In a final step 1:5, the server starts sending the streamed media data from the server 102 to the communication terminal 100. The command messages are conventional messages according to standards for streamed media data services, which are not described in detail here. Typically, the command messages are supplemented with various information parameters. However, to simplify the understanding of the process, these information parameters are not shown in the schematic FIG. 1.

In general, it is necessary to provide session description information before the session can be executed. The term "session description information" refers to information regarding e.g. available communication paths between a sending party and a receiving party, information capacity for the communication paths, etc. Session description information is typically stored both at the server and at the client terminal.

For distribution of session description information to client terminals in packet-switched communication service systems two methods are generally applied today: Either the session description information will be distributed from the server during the establishment of the communication session, or prior to the establishment of the communication session.

Distribution of session description information prior to establishment of a communication session can be performed when a client terminal wants to access a communication server at a later occasion, such as when a person subscribes to a service which allows downloading of streamed music from a server at a later occasion. The session description information can then be obtained via a communication path or via an alternative communication channel, such as an HTTP connection. An advantage of distributing the session description information prior to establishment of a communication session is that the time for establishing the communication session will be shortened.

Distribution of session description information during establishment of a communication session can be performed by beginning the establishment of the communication session by sending a request for session description information to the server, and then in response receiving the session description information. An advantage of distributing the session description information during the establishment of a communication session is that the session description information is up-to-date.

However, there are certain problems associated with the existing solutions outlined above. The user of a client terminal who wants to establish a communication session for streamed media data has to decide between spending a relatively long time on establishing the communication session, or running the risk of using session description information that is out of date. Using out of date session description information can give rise to unexpected errors if a selected communication path does not exist. On the other hand, the client terminal might not have knowledge of all available communication paths.

The session description information might be corrupted or modified during the transmission from the server to the client terminal, or during the storage at the client terminal.

SUMMARY

It is an object of the present invention to address at least some of the problems outlined above. In particular, it is an object to provide a solution which allows a relatively fast and reliable establishment of a communication session for streamed media between a client terminal and a server. These objects and others may be achieved primarily by a solution according to the attached independent claims.

According to different aspects, a client terminal and a method performed in the client terminal are provided for enabling a communication session for streamed media between the client terminal and a server.

In a method, a request-to-establish message is sent to the server, supplemented with session description information available at the client terminal. A response message is then received from the server, indicating whether the available session description information is correct or incorrect, the response message being supplemented with the correct session description information if the available session description information is incorrect. If the available session description information is correct, the session is executed by receiving media data from the server using the available session description information.

On the other hand, if the response message indicates that the available session description information is incorrect, the session description information at the client terminal may be updated with the received correct session description information, and a new request-to-establish message may be sent from the client terminal to the server, supplemented with the correct updated session description information. Moreover, the session description information supplemented with the request-to-establish message may be realised by a checksum generated based on the entire available session description information or some specific part(s) of it, e.g. media information and/or attribute information. Furthermore, the streamed media may be received according to the RTSP and the session description information may be formatted in accordance with the SDP.

A client terminal comprises a session description information unit and a communication unit. The session description information unit is adapted to store session description information available at the client terminal. The communication unit is adapted to send a request-to-establish message to the server via a communication link, supplemented with the available session description information, and to receive a response message indicating if the sent session description information is correct or incorrect. The session description unit is further adapted to update its stored session description information with the received correct information when received from the server.

Furthermore, the communication unit may also be adapted to receive streamed media from a server. Moreover, the client terminal may comprise a checksum generator adapted to generate a checksum based on the entire available session description information or some specific part(s) of it. The communication unit may then be adapted to send the generated checksum instead of the available session description information. The session description information unit may also be adapted to update the entire stored session description information, or just the incorrect part(s).

According to further aspects, a server and a method performed in the server are provided for enabling a communication session for streamed media between a client terminal and the server.

In a method, a request-to-establish message is received from the client terminal, supplemented with a checksum based on session description information available at the client terminal. It is then determined whether the received checksum is correct or incorrect, by comparing the checksum to a correct checksum generated based on correct session description information at the server. A response message is then sent to the client terminal, indicating whether the checksum and thereby the session description information available at the client terminal is correct or incorrect, the response message being supplemented with the correct session description information if the session description information available at the client terminal is incorrect. If the session description information available at the client terminal is correct, the session is executed by sending media data to the client terminal using the correct session description information.

On the other hand, if the result of the comparison indicates that the available session description information is incorrect, the server waits for a new request-to-establish message from the client terminal, supplemented with a new checksum generated based on the correct updated session description information.

A server comprises a session description information unit, a communication unit, and a determining unit. The session description information unit is adapted to store correct session description information available at the server. The communication unit is adapted to receive a request-to-establish message from the client terminal via a communication link, supplemented with session description information available at the client terminal, and to send a response message indicating if the received session description information is correct or incorrect. The determining unit is adapted to determine whether the received session description information is correct or incorrect, by comparing the received session description information to the correct one, and to output the result to the session description information unit. Moreover, the session description information unit is adapted to generate the response message, and supplement the response message with the correct session description information if the determining unit indicates that the received session description information is incorrect.

Furthermore, the server may comprise a checksum generator adapted to generate a checksum based on correct session description information available at the server, the communication unit may be adapted to receive a checksum based on the session description information available at the client terminal, and the determining unit may be adapted to compare the received checksum to the generated correct checksum.

According to another aspect, a method performed in a client terminal and a server is provided for enabling a communication session for streamed media between the client terminal and the server. A checksum based on at least a subset of session description information available at the client terminal is generated in the client terminal. Then a request-to-establish message is sent from the client terminal to the server, supplemented with the checksum generated in the client terminal. It is then determined in the server whether the received checksum is correct or incorrect, by comparing the checksum to a correct checksum generated based on correct session description information available at the server. A response message is then sent to the client terminal, indicating whether the checksum and thereby the session description information available at the client terminal is correct or incorrect, the response message being supplemented with the correct session description information if the session description information available at the client terminal is incorrect. If the session description information available at the client terminal is correct, the session is executed by sending media data from the server to the client terminal using the correct session description information.

On the other hand, if the result of the comparison indicates that the session description information available at the server is incorrect, the client terminal updates its available session description information with the correct received session description information. Finally, the process is repeated, by generating a new checksum in the client terminal based on the updated session description information, and sending a new request-to-establish message to the server, supplemented with the new checksum.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention can be used such that a client terminal and a server can achieve a relatively faster and more reliable establishment of a communication session for streamed media. A checksum based on available session description information is generated in a client terminal before being sent to a server. The server then generates a corresponding checksum based on correct session description information available at the server. The correct checksum is compared in the server to the received checksum. Finally, the server sends a response message to the client terminal, the response message indicating if the received checksum is correct or incorrect. If the comparison of the checksums indicates that the received checksum is incorrect, the server further supplements the response message with the correct session description information.

Throughout this description, the term "checksum" refers to any result of a logical or arithmetic operation performed on a bit stream, for enabling a check of the content of the bit stream. For instance, a hash-function, as MD5 (Message-Digest algorithm 5), SHA1, or a Cyclic Redundancy Check algorithm, or a check digit may be applied for generating the checksum. The functions and algorithms above are generally known in the art and are not necessary to describe in detail. Real Time Streaming Protocol is a commonly used protocol for transmission of streamed media data, and is hereinafter referred to as "RTSP". Session Description Protocol is a commonly used protocol for formatting session description information, regarding streamed media, and is hereinafter referred to as "SDP". The session description information comprises information regarding e.g. media and attributes. The protocols RTSP and SDP are not necessary to describe in detail here to understand the embodiments below.

Figure 1:
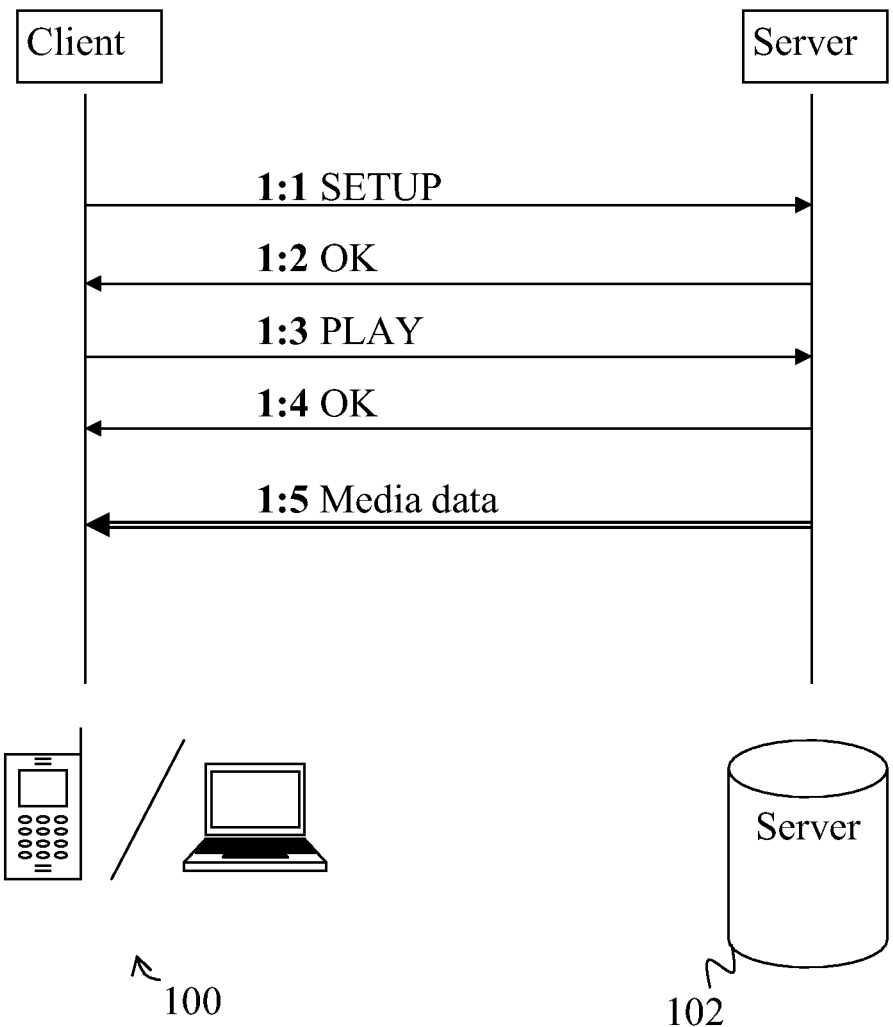
FIG. 1 is a signalling diagram illustrating a scenario where a client terminal is setting up a communication session for streamed media with a server, according to prior art.
Figure 2:
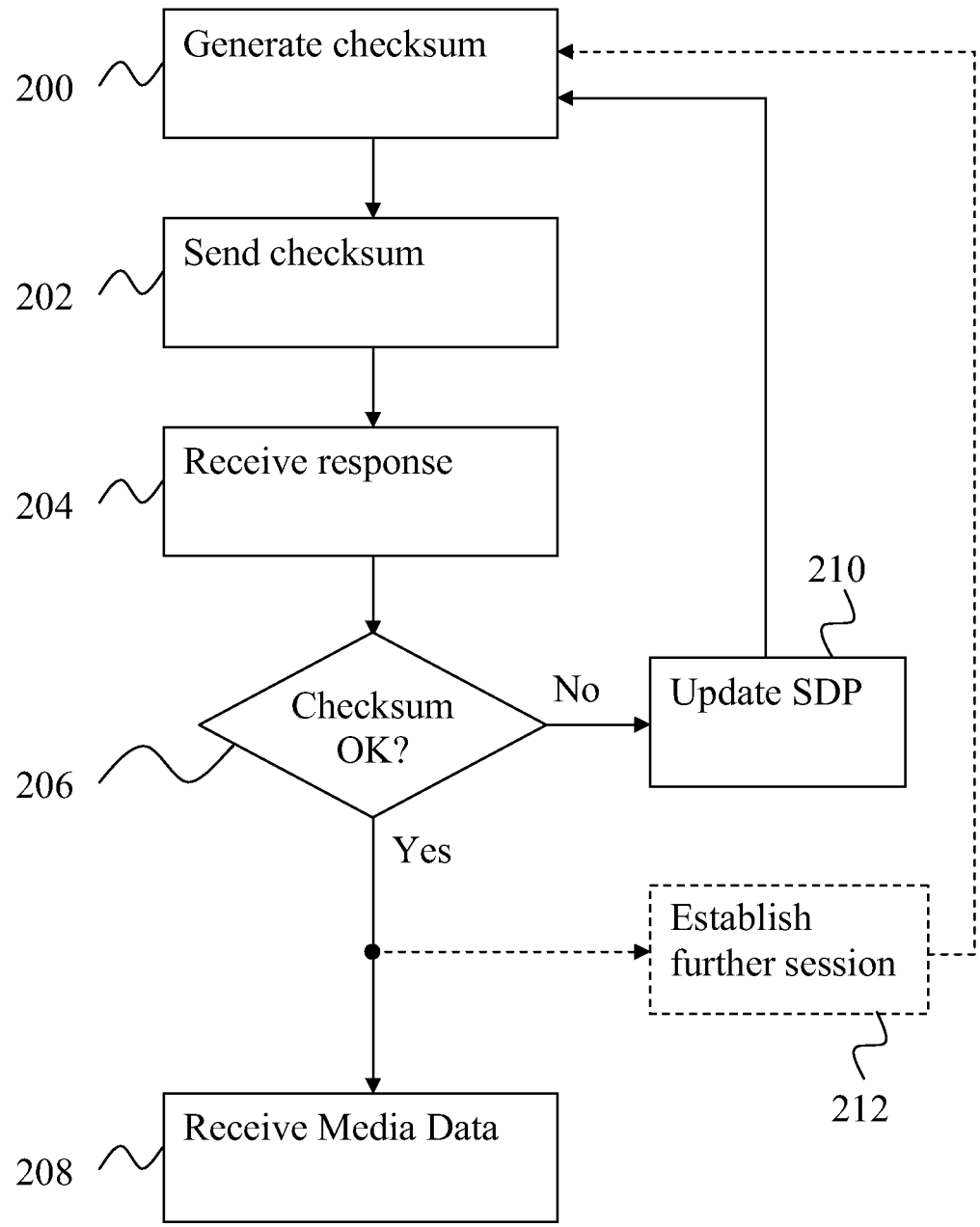
FIG. 2 is a flow chart illustrating a procedure for enabling a communication session for streamed media data performed in a client terminal, in accordance with one embodiment.

With reference to FIG. 2, illustrating a flow chart with steps executed in a client terminal, a procedure for enabling a communication session for streamed media data between the client terminal and a server in accordance with one embodiment will now be described. In a first step 200, an SDP checksum is generated based on SDP information available at the client terminal, by applying a checksum algorithm on the SDP information. The SDP checksum may be generated based on the available entire SDP information, or based on some specific parts of the SDP information. For instance, media information and/or attribute information of the SDP information may be used. In a next step 202, the generated SDP checksum is sent together with a request-to-establish message from the client terminal to the server, to be compared to a correct SDP checksum generated in the server for SDP information available at the server. The request-to-establish message may be realised by a <SETUP> message.

Then in a following step 204, a response message is received from the server, indicating whether the SDP checksum sent to the server is correct or not. Typically, if the sent SDP checksum is correct, the response message may be realised by an <OK> message. On the other hand, if the sent checksum is incorrect, the response message comprises a message indicating that the SDP checksum is incorrect. If the comparison performed by the server indicates that the SDP checksum received from the client terminal is incorrect; the response message will further be supplemented with the correct SDP information from the server. The received correct SDP information may comprise the entire SDP information or just the correction of the incorrect parts of the SDP information. In a further step 206, it is decided whether the available SDP information at the client terminal should be updated or not. The decision is based on the response message received in step 204. If the response message indicates that the sent SDP checksum is incorrect and is further supplemented with the correct SDP information, the available SDP information at the client terminal will be updated with the received correct SDP.

If it is decided in step 206 not to update the available SDP information at the client terminal, a communication session for streamed media is established between the client terminal and the server in a following step 208, the communication session being based on the SDP information already available at the client terminal. The client terminal then starts to receive streamed media from the server.

If it is instead decided in step 206 to update the SDP information, then in another step 210 the available SDP information is updated with the correct SDP information received with the response message in step 204. Finally, the steps 200-206 are repeated, using the updated SDP information now available at the client terminal.

In an optional step 212, illustrated with a dashed line, the client may also request to establish one or more additional communication sessions, simultaneously with an established communication session. In that case, the client then repeats the steps 200-206, regarding the additional communication session(s). For instance, if an audio session is established, a video session or a further audio session may be established.

Optionally, the client terminal may also send an initiating request message for a desired service supplemented with the SDP information available at the client terminal, and then receive a response message regarding the desired service, before the server starts sending the streamed media data in step 208. The initiating request message may be realised by a <PLAY> message. The messages: <SETUP>, <OK>, <PLAY>, etc., are commonly used messages while establishing sessions for streamed media, and are not necessary to describe in more detail here.

Although this exemplary embodiment describes a procedure where a client terminal requests to establish a communication session and waits for a response message before requesting a desired streamed media service, the invention is not limited thereto. The described procedure can, as realised by one skilled in the art, easily be adapted to be applied to any communication session for streamed media where a client terminal and a server exchanges session description information at the establishment of the session or during the session, e.g. for establishing a pipelined communication session, or a during a fast content switching session.

Figure 3:
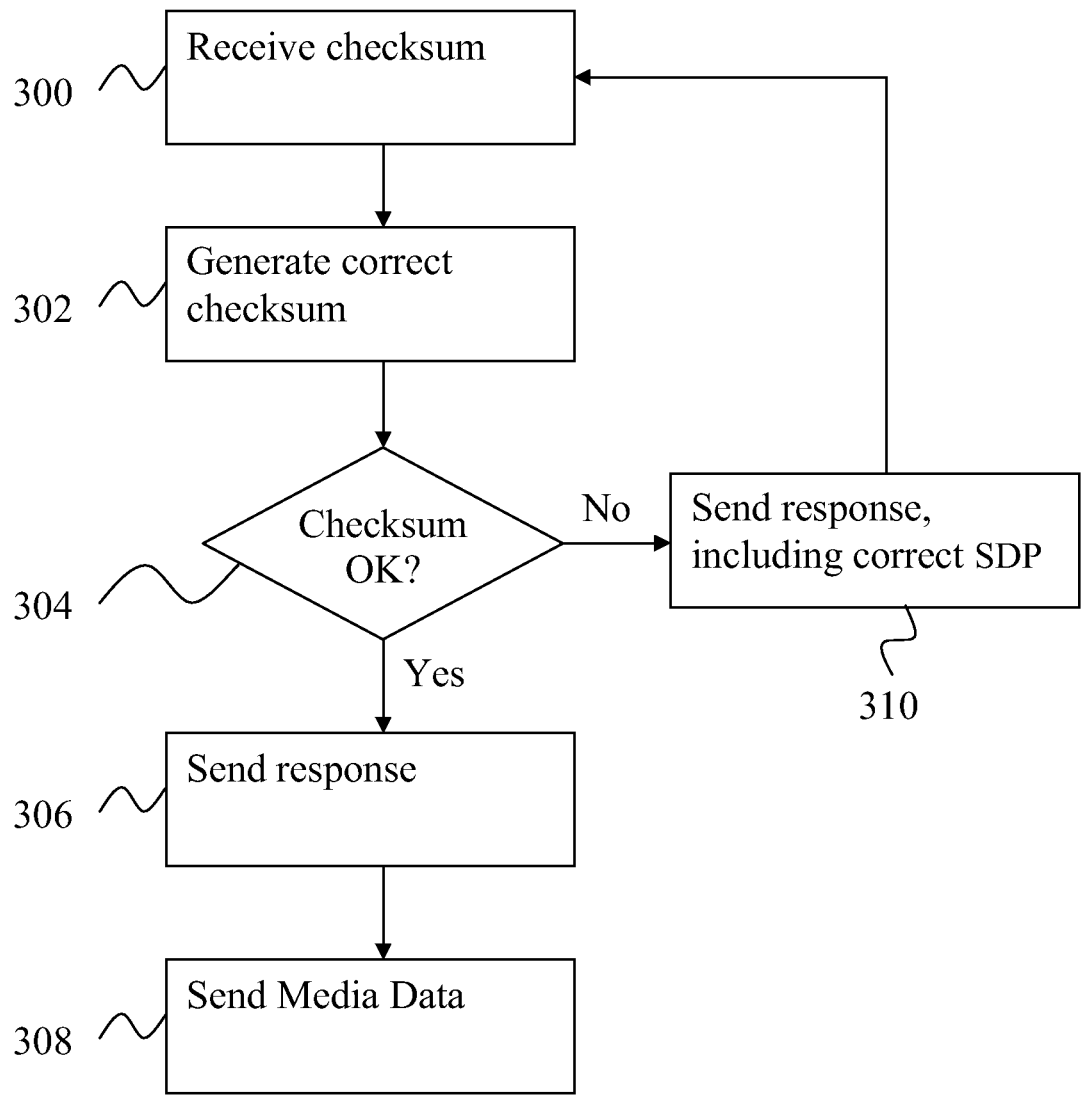
FIG. 3 is a flow chart illustrating a procedure for enabling a communication session for streamed media data performed in a server, in accordance with another embodiment.

With reference to FIG. 3, illustrating a flow chart with steps executed in a server, a method of enabling a communication session for streamed media between a client terminal and the server in accordance with one embodiment will now be described. In a first step 300, a request-to-establish message, supplemented with an SDP checksum is received from the client terminal. The received SDP checksum has been generated based on SDP information available at the client terminal. In a next step 302, a correct SDP checksum is generated based on correct SDP information available at the server. The received SDP checksum is then, in a following step 304, compared to the generated correct SDP checksum.

If the result of the comparison indicates that the received SDP checksum is correct, then in a further step 306, a response message is sent to the client terminal, confirming the received SDP checksum. In a following step 308, the communication session is then established and the server can start sending streamed media over the established communication session applying the correct SDP information.

On the other hand, if the result of the comparison indicates that the received SDP checksum is incorrect, then in a further step 310, a response message supplemented with the correct SDP information is sent to the client terminal, to update the SDP information available at the client terminal. The correct SDP information may comprise the entire SDP information or just the corrected parts. The server then repeats the steps 300-304, based on the updated SDP information.

Figure 4A:
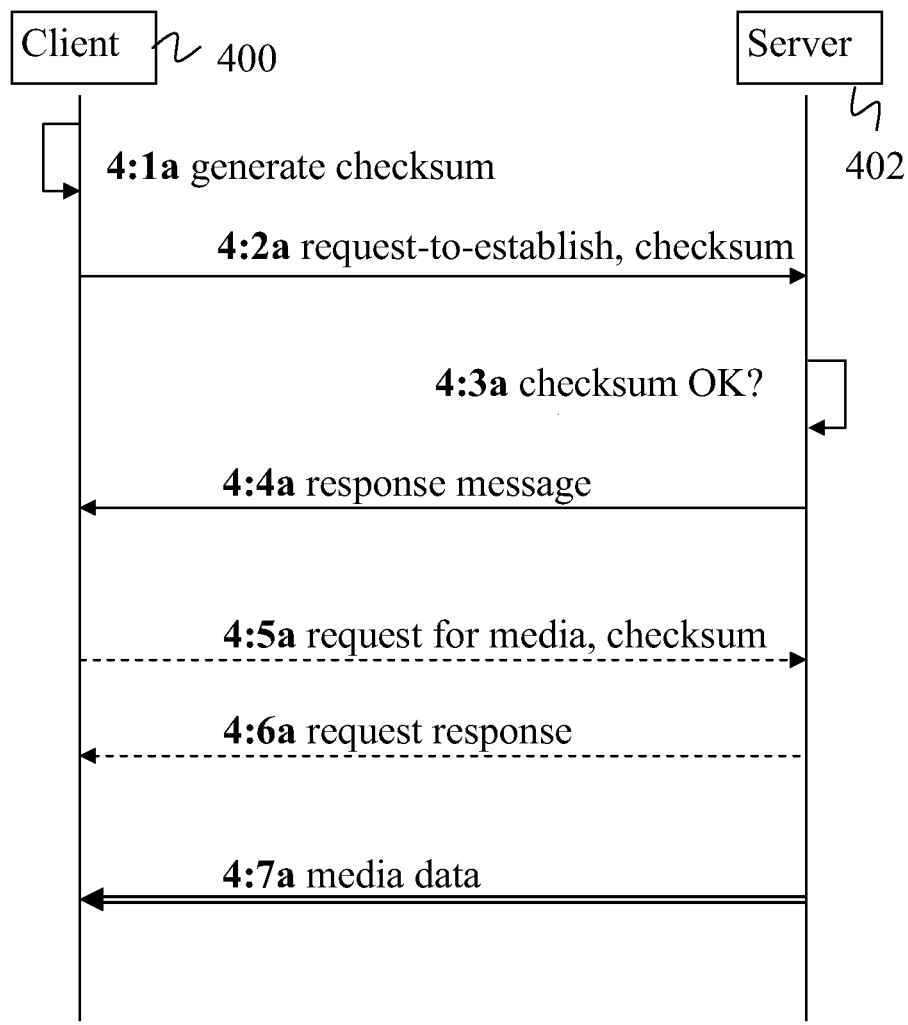
FIG. 4a is a signalling diagram illustrating a procedure for enabling a communication session for streamed media, in accordance with yet another embodiment.
Figure 4B:
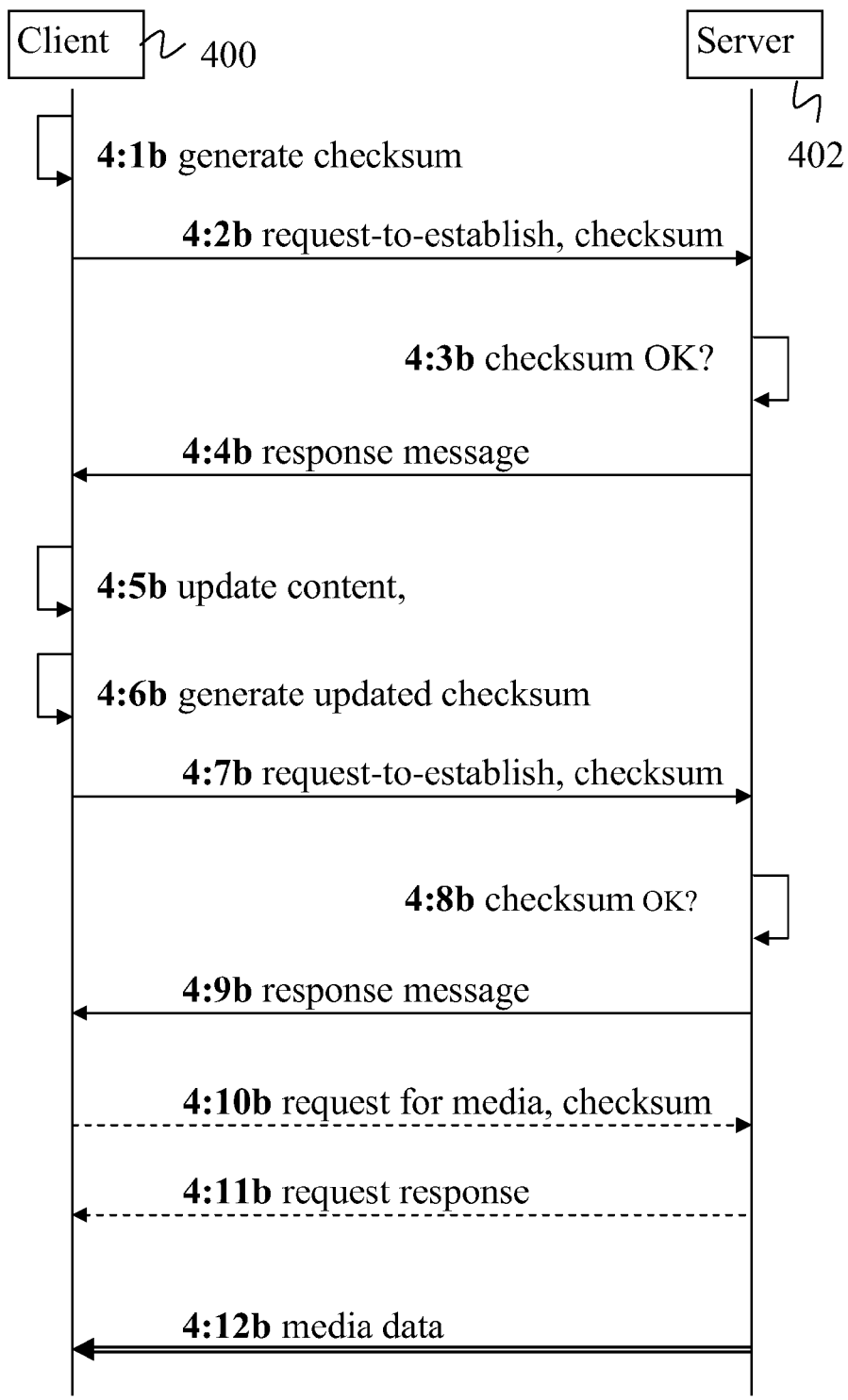
FIG. 4b is a signalling diagram illustrating a procedure for enabling a communication session for streamed media, in accordance with yet another embodiment.

With reference to the FIGS. 4a and 4b, illustrating signalling diagrams with messages exchanged between a client terminal 400 and a server 402, procedures of enabling a communication session for streamed media between the client terminal and the server in accordance with two further embodiments will now be described. FIG. 4a, illustrates the case where the SDP information available at the client terminal is correct, when FIG. 4b instead illustrates the case where the SDP information is incorrect.

According to the procedure illustrated in FIG. 4a, in a first step 4:1a, the client terminal 400 who wants to establish a communication session with the server 402 for streamed media, generates an SDP checksum based on SDP information available at the client terminal. The SDP checksum may be generated based on the entire SDP information, or on some specific parts of the SDP information, e.g. media information and/or attribute information. In a next step 4:2a, the client terminal sends a request-to-establish message to the server to initiate the establishment of the communication session, the request-to-establish message being supplemented with the SDP checksum generated in step 4:1a. As described above, the request-to-establish message may be realised by a <SETUP> message. The complete message may be: <SETUP>, <SDP-Available: "SDP checksum">.

In a following step 4:3a, performed in the server, another SDP checksum is generated based on the correct SDP information available at the server. The received SDP checksum is then compared to the correct SDP checksum.

In a further step 4:4a, a response message indicating the result from the comparison performed in step 4:3a is sent from the server to the client terminal. In this embodiment the compared checksums are identical, and the response message will therefore confirm that the available SDP information at the client terminal is correct. The response message may be realised by an <OK> message.

Optionally, the client terminal may also send an initiating request message for a desired service to the server, supplemented with the SDP information available at the client terminal, and receive a response message regarding the desired service, before the server starts sending the streamed media data. This is performed in the intermediate steps 4:5a and 4:6a, respectively, illustrated by dashed lines. The initiating request message for a desired service may be realised by a <PLAY> message, supplemented with the SDP checksum based on the SDP information available at the client terminal. The complete message may be: <PLAY>, <SDP-Available: "SDP checksum">. The response message may be realised by an <OK> message.

In a final step 4:7a, a communication session is established and the server starts sending the streamed media to the client terminal.

According to the procedure illustrated in FIG. 4b, in a first step 4:1b, the client terminal 400 who wants to establish a communication session with a server 402 for streamed media, generates an SDP checksum based on SDP information available at the client terminal. The SDP checksum may be generated based on the entire SDP information, or on some specific parts of the SDP information. In a next step 4:2b, the client terminal sends a request-to-establish message to the server to initiate the establishment of the communication session, the request-to-establish message being supplemented with the SDP checksum generated in step 4:1b. As described above, the request-to-establish message may be realised by a <SETUP> message. In a following step 4:3b, performed in the server, another SDP checksum is generated based on the correct SDP information available at the server. The received SDP checksum is then compared to the correct SDP checksum. The steps 4:1b-4:3b corresponds to the steps 4:1a-4:3a in the above described embodiment, but are performed for incorrect SDP information available at the client terminal.

In a further step 4:4b, a response message indicating the result from the comparison performed in step 4:3b is sent from the server to the client terminal. In this embodiment the compared checksums are not identical, and the response message will therefore indicate that the available SDP information at the client terminal is incorrect. The response message is further supplemented with the correct SDP information from the server. The sent correct SDP information may comprise the entire SDP information or just the corrected parts. The complete message may be: <Incorrect SDP checksum>, <Content length 295>, <"SDP">.

In a following step 4:5b, the client terminal updates the available SDP information with the received correct SDP information. The client terminal makes then a new attempt to establish the communication session using the updated SDP information, by in a further step 4:6b, generating an SDP checksum based on the updated SDP information, before sending a new request-to-establish message to the server supplemented with the generated SDP checksum, in a following step 4:7b. In another step 4:8b, performed in the server, another SDP checksum is generated based on the correct SDP information available at the server. The received SDP checksum is then compared to the correct SDP checksum.

In a further step 4:9b, a response message indicating the result from the comparison performed in step 4:8b is sent to the client terminal. In this embodiment the compared checksums are identical, and the response message will therefore confirm that the updated available SDP information at the client terminal is correct. The response message may be realised by an <OK> message. The steps 4:6b-4:9b corresponds to the steps 4:1b-4:4b, but are performed for updated SDP information at the client terminal.

As described in the embodiment above, the client terminal may in addition also send an initiating request message for a desired service to the server supplemented with the SDP information available at the client terminal, and receive a response message regarding the desired service, before the server starts sending the streamed media. This is performed in the intermediate steps 4:10b and 4:11b, respectively, illustrated by dashed lines. Analogously to steps 4:5a described in the embodiment above, the initiating request message for a desired service may be realised by a <PLAY> message, supplemented with the SDP checksum based on the updated SDP information available at the client terminal. Furthermore, the response message may be realised by an <OK> message.

In a final step 4:12b, a communication session is established and the server starts sending the streamed media to the client terminal.

The above described procedures can easily be adapted to be applied to any communication session for streamed media where a client terminal and a server exchanges session description information at the establishment of the session or during the session.

In an alternative embodiment, different from the above described, the entire available SDP information at the client terminal, or a part of the entire SDP information may be sent to the server instead of an SDP checksum. In the server in this embodiment the entire SDP information or a part of the SDP information is compared to the SDP information available in the server.

Figure 5:
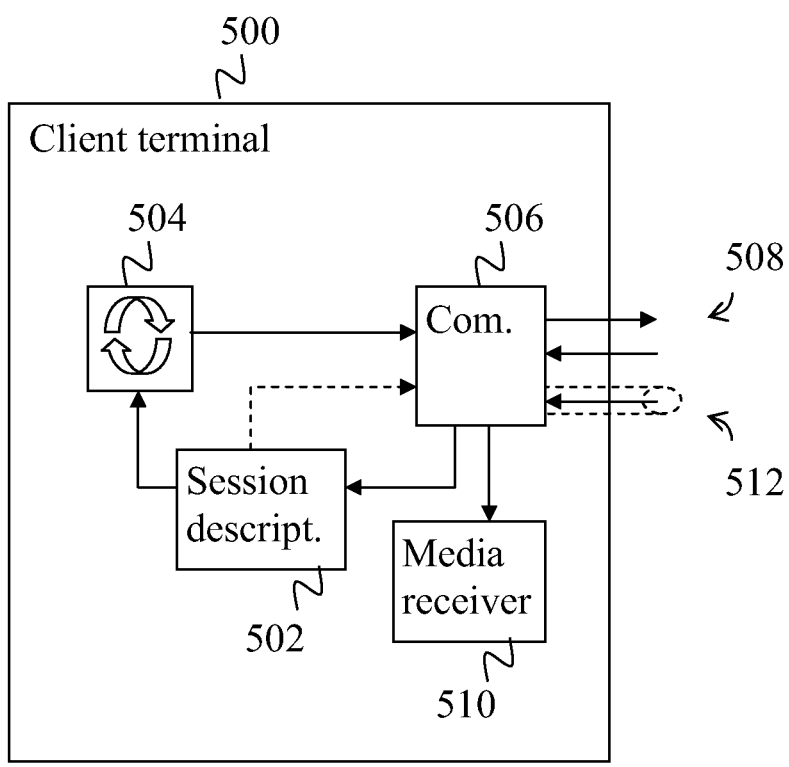
FIG. 5 is a block diagram illustrating a client terminal in more detail, in accordance with a further embodiment.

With reference to FIG. 5, an embodiment of a client terminal 500 for enabling a communication session 512 for streamed media with a server will now be described. The client terminal 500 comprises a session description information unit 502, a checksum generator 504, a communication unit 506, and media receiving unit 510. The session description information unit 502 is adapted to output its available SDP information to the checksum generator 504 when the client terminal 500 establishes a communication session with a server for streamed media. The checksum generator 504 is adapted to generate an SDP checksum based on the received SDP information and to output the generated SDP checksum to the communication unit 506. The checksum generator 504 may generate the SDP checksum based on the entire available SDP information, or just some part(s) of it, e.g. from media information and/or attribute information. The communication unit 506 is adapted to send a request-to-establish message, supplemented with the received SDP checksum to the server over a communication link 508.

The communication unit 506 is further adapted to receive a response message from the server over the communication link 508, in response to the request-to-establish message, the response message indicating whether the sent SDP checksum is correct or incorrect. The SDP checksum can be incorrect due to various reasons, e.g. the SDP checksum is affected by transmission errors during the transmission from the client terminal 500 to the server, or the SDP checksum can be generated based on SDP information being out of date, etc.

The communication unit 506 is further adapted to establish a communication session 512 with the server and to start receiving streamed media from the server over the established communication session 512, if the response message indicates that the sent SDP checksum is correct, the communication session being based on the available SDP information in the session description information unit 502. Furthermore, the communication unit 506 is adapted to supply the received streamed media to the media receiver 510. The client terminal 500 is also adapted to send an initiating request message for a desired service to the server over the communication link 508, before the server starts to send the streamed media over the established communication session 512. The initiating request message may be supplemented with the generated SDP checksum.

Furthermore, the communication unit 506 is adapted to receive the correct SDP information from the server over the communication link 508, if the received response message indicates that the sent SDP information is incorrect. The communication unit 506 is further adapted to output the correct SDP information to the session description information unit 502, which is further adapted to update its available stored SDP information, and output the updated SDP information to the checksum generator 504. The checksum generator 504 is further adapted to generate an updated SDP checksum based on the updated SDP information, and the communication unit 506 is further adapted to send a new request-to-establish message supplemented with the updated SDP checksum.

The client terminal may also be adapted to request to establish one or more additional communication sessions, simultaneously with an established communication session. For instance, if an audio session is established, a video session or a further audio session may be established.

Optionally, the session description information unit 502 may be adapted to output the entire SDP information or just some part(s) of it to the communication unit 506. The communication unit 506 may also be adapted to send the received SDP information the server.

Figure 6:
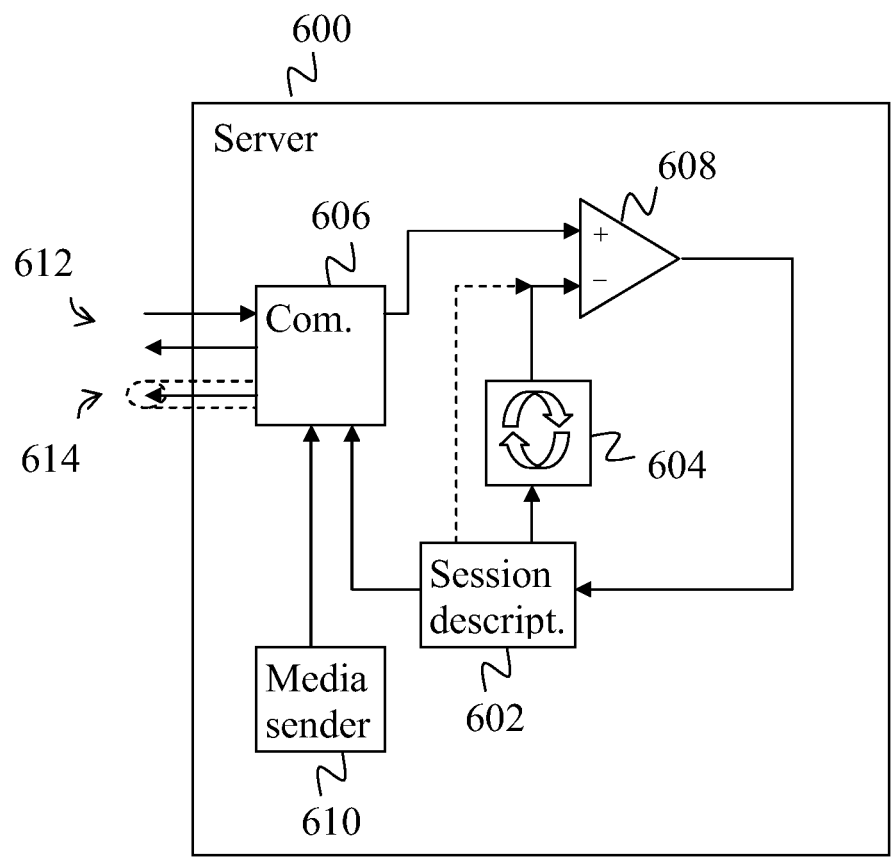
FIG. 6 is a block diagram illustrating a server in more detail, in accordance with a further embodiment.

With reference to FIG. 6, an embodiment of a server 600 for enabling a communication session 614 for streamed media with a client terminal will now be described. The server 600 comprises a session description information unit 602, a checksum generator 604, a communication unit 606, a determining unit 608, and a media sending unit 610. When the client terminal establishes a communication session 614 with the server for streamed media, the communication unit 606 is adapted to receive a request-to-establish message supplemented with an SDP checksum from the client terminal over a communication link 612, the received SDP checksum being generated based on the SDP information available at the client terminal. The communication unit 606 is further adapted to supply the received SDP checksum to a first input of the determining unit 608. The session description unit 602 is adapted to output the correct SDP information to the checksum generator 604, which is adapted to generate a correct SDP checksum and supply to a second input of the determining unit 608. The determining unit 608 is adapted to compare the SDP checksum received from the client terminal to the correct SDP checksum, and output the result from the comparison to the session description information unit 602.

The session description unit 602 is further adapted to initiate the communication unit 606 to send a response message to the client terminal when receiving the result from the comparison, the response message indicating the result from the comparison. Furthermore, the session description information unit 602 is adapted to supply the correct SDP information to the communication unit 606, to be sent over the communication link 612 supplemented to the response message, if the result of the comparison indicates that the SDP checksum received from the client terminal is incorrect.

The communication unit 606 is further adapted to establish the communication session 614 and to start sending streamed media to the client terminal over the established communication session 614, based on the available SDP information in the session description information unit 602, if the result of the comparison instead indicates that the received SDP checksum is correct. Moreover, the communication unit 606 is adapted to receive the media to be sent from the media sender 610.

Optionally, the server 600 may also be adapted to receive an initiating request message from the client terminal over the communication link 612, before the server starts to send the streamed media over the established communication session 614. The initiating request message may be supplemented with the SDP checksum generated in the client terminal.

Optionally, the session description information unit 602 may be adapted to output the entire SDP information or just some part(s) of it to the determining unit 608. The communication unit 606 may also be adapted to receive the entire SDP information or just some part(s) of it from the client terminal, and supply to the determining unit 608. The determining unit may also be adapted to compare SDP information instead of SDP checksums.

The described client terminal 500 and server 600 can easily, as is realised by one skilled in the art, be adapted to be applied for any communication session for streamed media data where a client terminal and a server exchanges session description information at the establishment of the session or during the session, e.g. for establishing a pipelined communication session, or a during a fast content switching session.

Furthermore, it is to be understood that the client terminal and the server described above in this description also comprises additional conventional means providing functionality, such as e.g. various control units and memories, necessary for enabling common functions and features to operate properly. However, for simplicity reasons, any means or functionality which is not necessary for the understanding of the proposed establishing of a communication session for streamed media has been omitted in the figures, and will not be discussed in any further detail in this description.

By means of the present invention, a fast and reliable method for enabling a communication session for streamed media data from a server to a client terminal is obtained. Using the above described solution, the enabling of the communication session can be performed by applying session description information distributed to the client terminal on beforehand. Moreover, the user of the client terminal does not run the risk of using session description information, being out of date or being affected by various failures.

While the invention has been described with reference to specific exemplary embodiments, the description is in general only intended to illustrate the inventive concept and should not be taken as limiting the scope of invention. Although a client terminal and a media server have been used throughout when describing the above embodiments, any other communication terminal suitable for communicating streamed media, may be used in the manner described.

The invention is generally defined by the following independent claims.

The invention claimed is:

1. A method for enabling a communication session for streamed media between a client terminal and a server, the method comprising:
   a) sending, from the client terminal, a request message to the server, supplemented with session description information available at the client terminal; and
   b) receiving, at the client terminal, a response message from the server indicating whether the session description information is correct or incorrect, the response message being supplemented with the correct session description information if the sent session description information is incorrect;
   wherein, if the response message indicates that the sent session description information is correct, the session is executed by receiving media data from the server.

2. The method according to claim 1, wherein the request message is a PLAY message.

3. The method according to claim 1, wherein the request message is a request-to-establish message.

4. The method according to claim 1, wherein, if the response message indicates that the sent session description information is incorrect, the following further steps are executed:
   c) updating the session description information available at the client terminal based on the correct session description information received with the response message; and
   d) repeating the steps a-b using the updated session description information to enable execution of the session.

5. The method according to claim 1, wherein the further step a' is executed before step a, said step a' being:
   a') generating a checksum based on at least a subset of session description information available at the client terminal; and
   wherein the session description information sent in step a) is the generated checksum.

6. The method according to claim 5, wherein the checksum is generated based on media information in at least one of the session description information and attribute information in the session description information.

7. The method according to claim 5, wherein the checksum is generated based on the entire session description information, the entire session description information is received from the server if the checksum is incorrect, and further the entire session description information is updated in step c).

8. The method according to claim 1, wherein the session description information supplemented to the request message is the entire session description information or one or more parts of the session description information.

9. The method according of claim 1, wherein the streamed media is received according to the RTSP and the session description information is formatted in accordance with the SDP.

10. A method for enabling a communication session for streamed media between a client terminal and a server, comprising the following steps being executed in the server:
    a) receiving a request message supplemented with a checksum based on at least a subset of session description information available at the client terminal;
    b) determining whether the received checksum is correct or incorrect;
    c) sending a response message indicating whether the checksum is correct or incorrect to the client terminal, and further, if the checksum is incorrect, supplementing the response message with the correct session description information available at the server;
    wherein, if the response message indicates that the checksum is correct, the session is executed by sending media data to the client terminal, and
    wherein, if the response message indicates that the checksum is incorrect, the further step is executed:
    d) repeating the steps a-c using the updated session description information to enable execution of the session.

11. The method according to claim 10, wherein the request message is a PLAY message.

12. The method according to claim 10, wherein the request message is a request-to-establish message.

13. A method for enabling a communication session for streamed media between a client terminal and a server, comprising the following steps:
    a) generating in the client terminal a checksum based on at least a subset of session description information available at the client terminal;

b) sending a request-to-establish message, supplemented with the checksum from the client terminal to the server; and c) determining in the server whether the received checksum is correct or incorrect, sending a response message from the server to the client terminal, and further if the checksum is incorrect supplementing the response message with the correct session description information available at the server;

wherein, if the response message indicates that the checksum is correct, the session is executed by sending media data from the server to the client; and wherein, if the response message indicates that the checksum is incorrect the following steps are executed:

d) updating the session description information available at the client terminal based on the correct session description information received with the response message; and e) repeating the steps a-c using the updated session description information.

14. The method according to claim 13, wherein the determination if the checksum is correct or incorrect is performed by generating a correct checksum based on at least a subset of correct session description information available at the server, and comparing the received checksum to the generated checksum.

15. A client terminal for enabling a communication session for streamed media with a server, comprising:

a) a session description information circuit adapted to store session description information available at the client terminal;

b) a communication circuit adapted to send a request-to-establish message supplemented with the stored session description information via a communication link to the server, and further adapted to receive a response message from the server via the communication link indicating whether the session description information is correct or incorrect;

said session description information circuit being further adapted to update the stored session description information when correct session description information is received.

16. The client terminal according to claim 15, further comprising a media receiving circuit, and wherein the communication circuit is further adapted to receive streamed media from the server and supply to the media receiving circuit.

17. The client terminal according to claim 15, wherein:
the communication circuit is further adapted to receive the streamed media according to the RTSP; and
the session description information circuit is further adapted to store the session description information formatted in accordance with the SDP.

18. The client terminal according to claim 15, further comprising a checksum generator that is further adapted to generate a checksum based on at least one of media information in the session description information and attribute information in the session description information.

19. The client terminal according to claim 18, wherein the checksum generator is further adapted to generate the checksum based on the entire session description information available at the client terminal, and wherein the session description information unit circuit is further adapted to store the entire session description information and to update the entire session description information available at the client terminal when the response message is provided with the correct session description information.

20. A server for enabling a communication session for streamed media with a client terminal, comprising:

a) a session description information circuit adapted to store session description information;

b) a communication circuit adapted to receive a request-to-establish message supplemented with session description information available at the client terminal via a communication link, and further adapted to send a response message to the client terminal via the communication link indicating whether the session description information is correct or incorrect; and c) a determining circuit adapted to determine if the received session description information is correct, and output the result to the session description information circuit;

said session description information circuit being further adapted to generate the response message, and supplement the response message with the correct session description information if the determining circuit indicates that the received session description information is incorrect.

21. The server according to claim 20, further comprising a checksum generator adapted to generate a correct checksum based on at least a subset of the session description information stored in the session description information circuit, and wherein the determining circuit is further adapted to perform the determination by comparing the received checksum to the correct checksum.

22. The server according to claim 21, wherein the checksum generator is further adapted to generate the checksum based on at least one of media information in the session description information and attribute information in the session description information.

23. The server according to claim 21, wherein the checksum generator is further adapted to generate the checksum based on the entire session description information available at the server, and wherein the session description information circuit is further adapted to store the entire session description information, and to supply the entire session description information to the communication circuit to be supplemented to the response message.

24. The server according to claim 20, further comprising a media sending circuit, wherein the communication circuit is further adapted to receive streamed media from the media sending circuit and send the received streamed to the client terminal.

25. The server according to claim 20, wherein:
the communication circuit is further adapted to communicate the streamed media according to the RTSP; and
the session description information circuit is further adapted to store the content of session description information being formatted in accordance with the SDP.

* * * * *

UNITED STATES PATENT AND TRADEMARK OFFICE
CERTIFICATE OF CORRECTION

| | | |
|---|---|---|
| PATENT NO. | : 8,838,805 B2 | Page 1 of 1 |
| APPLICATION NO. | : 12/812126 | |
| DATED | : September 16, 2014 | |
| INVENTOR(S) | : Brodin et al. | |

It is certified that error appears in the above-identified patent and that said Letters Patent is hereby corrected as shown below:

In the Claims

In Column 14, Line 2, in Claim 19, delete "information unit" and insert -- information --, therefor.

Signed and Sealed this
Fifth Day of May, 2015

Michelle K. Lee
*Director of the United States Patent and Trademark Office*